(12) United States Patent
Wilson

(10) Patent No.: US 8,246,298 B2
(45) Date of Patent: Aug. 21, 2012

(54) BORESCOPE BOSS AND PLUG COOLING

(75) Inventor: Barry Allan Wilson, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 848 days.

(21) Appl. No.: 12/393,084

(22) Filed: Feb. 26, 2009

(65) Prior Publication Data

US 2010/0215477 A1   Aug. 26, 2010

(51) Int. Cl.
  *F01D 11/08* (2006.01)
(52) U.S. Cl. ........................................ 415/116; 416/191
(58) Field of Classification Search .................. 415/115, 415/116, 173.1; 416/191
  See application file for complete search history.

(56) References Cited

U.S. PATENT DOCUMENTS

| | | |
|---|---|---|
| 4,815,276 A | 3/1989 | Hansel et al. |
| 5,612,497 A | 3/1997 | Walter et al. |
| 6,468,033 B1 | 10/2002 | Weidlich |
| 7,520,715 B2 * | 4/2009 | Durocher et al. ............. 415/116 |

* cited by examiner

*Primary Examiner* — Quoc Hoang
(74) *Attorney, Agent, or Firm* — William Scott Andes; Steven J. Rosen

(57) ABSTRACT

A coolable borescope boss includes cooling passages extending through the boss and oriented for spraying cooling air into a hole extending through the boss. Centerlines of the cooling passages may intersect the a hole axis of the hole. The cooling passages may be cylindrical or open slots disposed through the boss. The boss may be on an arcuate gas turbine engine shroud segment circumscribed about an axial centerline axis. The segment may be part of an annular segmented turbine shroud having cylindrical shroud first and second sections and a conical shroud midsection therebetween and the segment having cylindrical segment first and second sections and a conical segment midsection therebetween. A hole exit of the hole being flush with the conical segment midsection. A borescope plug tip having a spherical tip chamfer may be used to seal against a conical boss chamfer of the boss.

71 Claims, 6 Drawing Sheets

BORESCOPE BOSS AND PLUG COOLING

GOVERNMENT INTERESTS

This invention was made with government support under government contract No. N00019-04-C0093 awarded by the Department of Defense. The government has certain rights to this invention.

BACKGROUND OF THE INVENTION

1. Technical Field

This invention relates to aircraft gas turbine engines and, particularly, to borescope inspection ports on gas turbine engines.

2. Background Information

Borescope inspection ports are commonly used on aircraft gas turbine engines. Borescope ports allow visual inspection of internal aircraft engine flowpath hardware with a fiber optic borescope. These borescope ports make possible frequent engine inspections that otherwise could not be performed without disassembly of the aircraft engine. This allows increased engine usage between overhaul and, thus, lowers aircraft engine operating costs. During engine operation, borescope plugs are used to close the inspection ports on the engine and prevent the escape of high pressure engine gases. Conventional borescope plugs typically close an outer port through an engine casing and seals a flowpath structure such as a turbine blade shroud at an inner port. A spring loaded plunger seals against the inner port. A bolt head is provided for assembling and disassembling the plug from a threaded mount on the engine casing.

Borescope plugs are used to plug the inspection ports used during borescope inspections of hot sections of the engine such as the high pressure turbine (HPT). An exemplary borescope plug and inspection ports are disclosed in U.S. Pat. No. 4,815,276 and incorporated herein by reference. The plugs have to endure the harsh environment near the hot turbine flowpath, while being made out of less capable materials than other parts near the flowpath in the HPT. Since the plug does not extend all the way to the flowpath, a cavity is formed in the port below or radially inward of the plug. This cavity entraps hot flowpath air resulting in high metal temperatures on the port walls and a tip of the plug. Overheating of the port and the tip due to stagnating hot air entrapped by the cavity can cause premature deterioration of the port and the tip requiring expensive repairs. Thus, it is highly desirable to have to provide low cost and effective cooling of both the plug tip and the port.

BRIEF DESCRIPTION OF THE INVENTION

A coolable element having opposite first and second sides and a coolable borescope boss extending away from the second side. A boss hole extends through the boss and terminates at a hole exit flush with a first outer surface of the first side. Cooling passages extending through the boss are oriented for spraying cooling air into the boss hole. An exemplary embodiment of the cooling passages are oriented for the spraying cooling air towards a boss hole axis of the boss hole. Centerlines of the cooling passages may intersect the boss hole axis. An exemplary embodiment of the coolable element includes a conical boss chamfer in the boss around an entrance to the boss hole.

Another exemplary embodiment of the coolable element includes a cylindrical cavity surface between the hole exit and a chamfer inner end of a boss chamfer in the coolable borescope boss around an entrance to the boss hole. The cooling passages have a first portion of the cooling passages having a first portion of cooling inlets in a boss outer surface of the coolable borescope boss radially outward of or above the coolable surface, a second portion of the cooling passages having a second portion cooling inlets in the coolable surface, and the cooling passages having cooling outlets at least partially disposed in the cylindrical cavity surface. Two exemplary embodiments of the cooling passages are cylindrical and open slots disposed through the boss. The open slots may extend through and into the boss from a continuous outer surface of the coolable borescope boss. The continuous outer surface includes a top surface of the boss surrounding the entrance to the boss hole, the boss outer surface of the boss, an outer surface of the boss chamfer, and the cylindrical cavity surface. The boss chamfer and the outer surface of the boss chamfer may be conical.

The coolable element may be a coolable gas turbine engine arcuate shroud segment circumscribed about an axial centerline axis and having opposite first and second sides. The coolable borescope boss extends away from the second side and has a boss hole extending through the coolable borescope boss and terminating at a hole exit flush with a first outer surface of the first side. The cooling passages extend through the boss and are oriented for spraying cooling air into the boss hole. One exemplary embodiment of the segment has cylindrical segment first and second sections and a conical segment midsection therebetween and the hole exit is flush with the conical segment midsection.

An annular segmented turbine shroud assembly having an annular segmented turbine shroud circumscribed about an axial centerline axis includes a plurality of shroud segments. At least one of the shroud segments having opposite first and second sides also includes the coolable borescope boss extending away from the second side. The boss hole extends through the coolable borescope boss and terminates at a hole exit flush with a first outer surface of the first side. The cooling passages extend through the coolable borescope boss and are oriented for spraying cooling air into the boss hole. A borescope plug includes a plug body and a plunger having a tip. The tip has a spherical tip chamfer sealing against the boss chamfer.

The coolable boss may be incorporated in a turbine assembly having high and low pressure turbines including the annular segmented turbine shroud circumscribed about the axial centerline axis and having a plurality of shroud segments. The shroud includes cylindrical shroud first and second sections and a conical shroud midsection therebetween. The cylindrical shroud first section surrounds a high pressure turbine and the cylindrical shroud second section surrounds a low pressure turbine first stage.

DETAILED DESCRIPTION OF THE INVENTION

Figure 1:
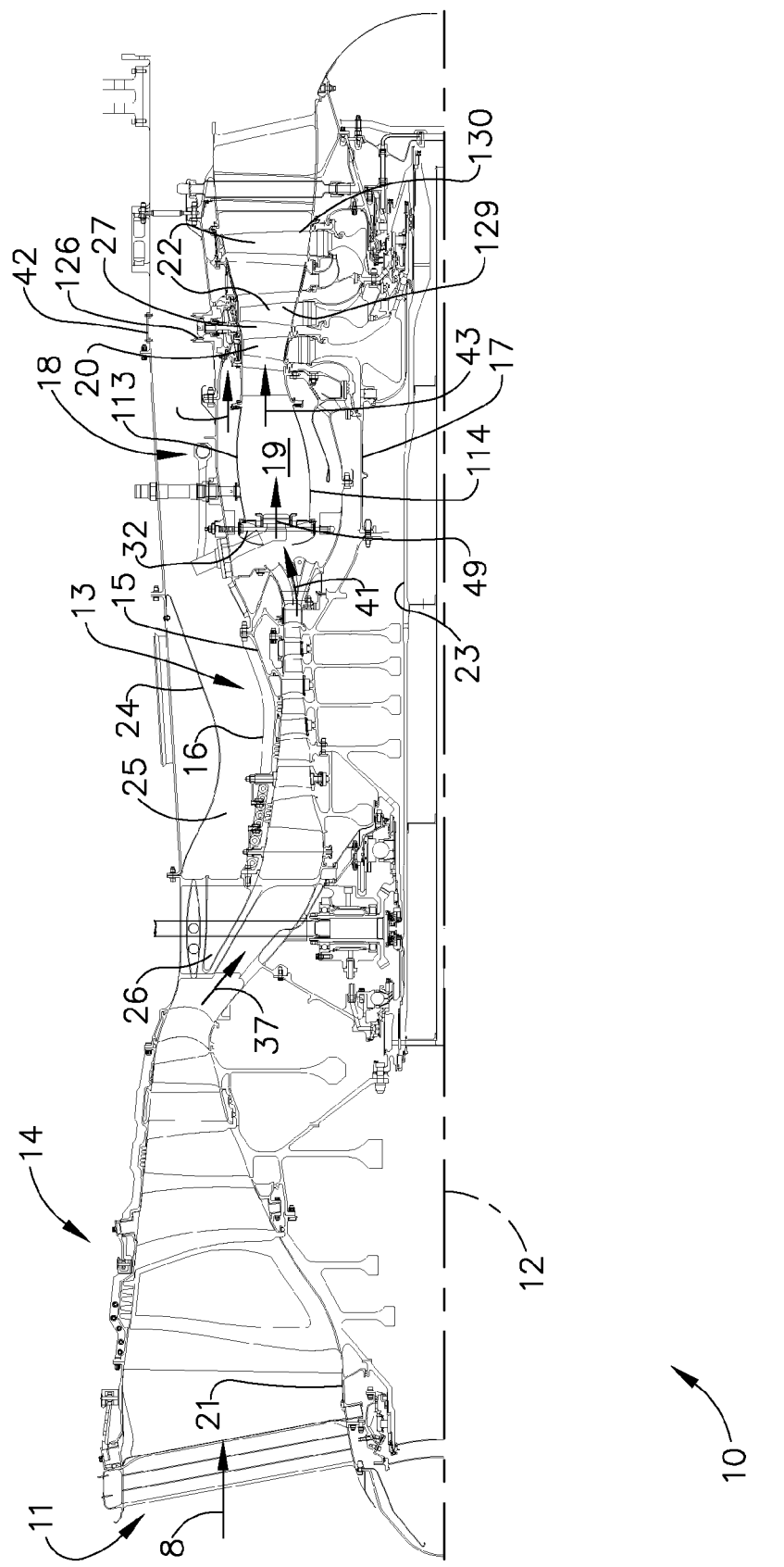
FIG. 1 is a sectional view illustration of a gas turbine engine having a cooling system for cooling a borescope boss and borescope plug tip.

Illustrated in FIG. 1 is an exemplary turbofan gas turbine engine 10 for powering an aircraft (not shown) in flight. The engine 10 is axisymmetrical about a longitudinal or axial centerline axis 12 and has a fan section 14 upstream of a core engine 13. The core engine 13 includes, in serial downstream flow communication, a multistage axial high pressure compressor 16, an annular combustor 18, and a single stage high pressure turbine 20 suitably joined to the high pressure compressor 16 by a high pressure drive shaft 17. The combustor 18 includes radially spaced apart annular outer and inner combustor liners 113, 114, respectively, disposed coaxially about the centerline axis 12 and including an annular combustion zone 19 therebetween.

Downstream of the core engine 13 is a two stage low pressure turbine 22 including low pressure turbine first and second stages 129, 130 suitably joined to the fan section 14 by a low pressure drive shaft 23. The core engine 13 is contained within a core engine casing 15 and an annular bypass duct 24 containing a bypass flowpath 25 circumscribed about the core engine 13. A fan casing 21 circumscribes the fan section 14. The bypass duct 24 extends from the fan section 14 downstream past the low pressure turbine 22. The high and low pressure turbines 20, 22 are counter-rotatable with respect to each other and have a vaneless interface 27 therebetween as more particularly illustrated in FIG. 2.

Engine air 8 enters the engine through an engine inlet 11 and is initially pressurized as it flows downstream through the fan section 14 with an inner portion thereof referred to as core engine air 37 flowing through the high pressure compressor 16 for further compression. An outer portion of the engine air is referred to as bypass air 26 and is directed to bypass the core engine 13 and flow through the bypass duct 24. The core engine air 37 is discharged from the high pressure compressor 16 at what is referred to as core discharge pressure (CDP) and a first portion 49 of core discharge pressure air 41 is suitably mixed with fuel by fuel injectors 32 and carburetors in the combustor 18 and ignited in the combustion zone 19 for generating hot combustion gases 43 which flow through the high and low pressure turbines 20, 22.

Figure 2:
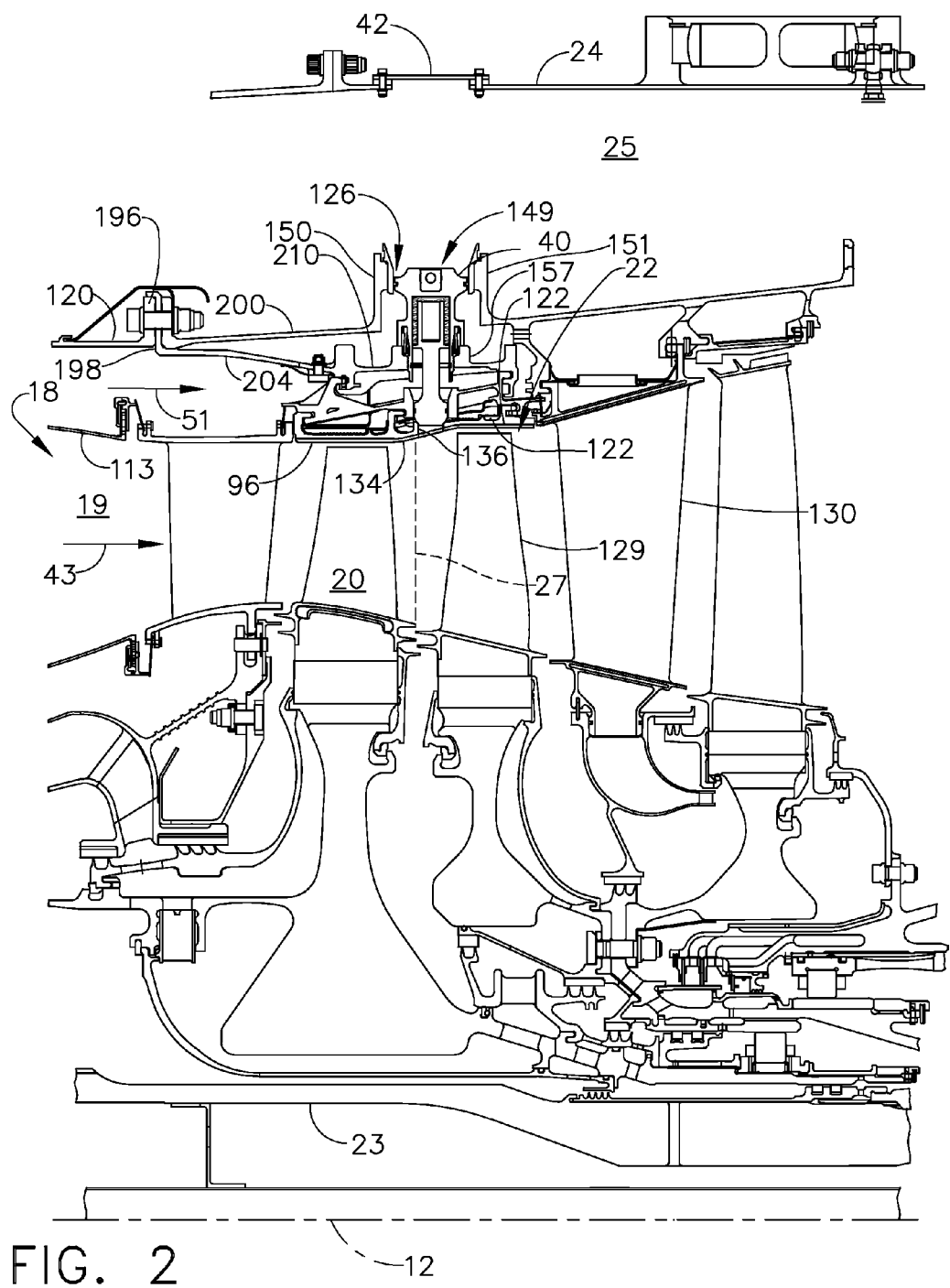
FIG. 2 is an enlarged sectional view illustration of high and low pressure turbine sections and borescope boss assembly of the engine illustrated in FIG. 1.
Figure 3:
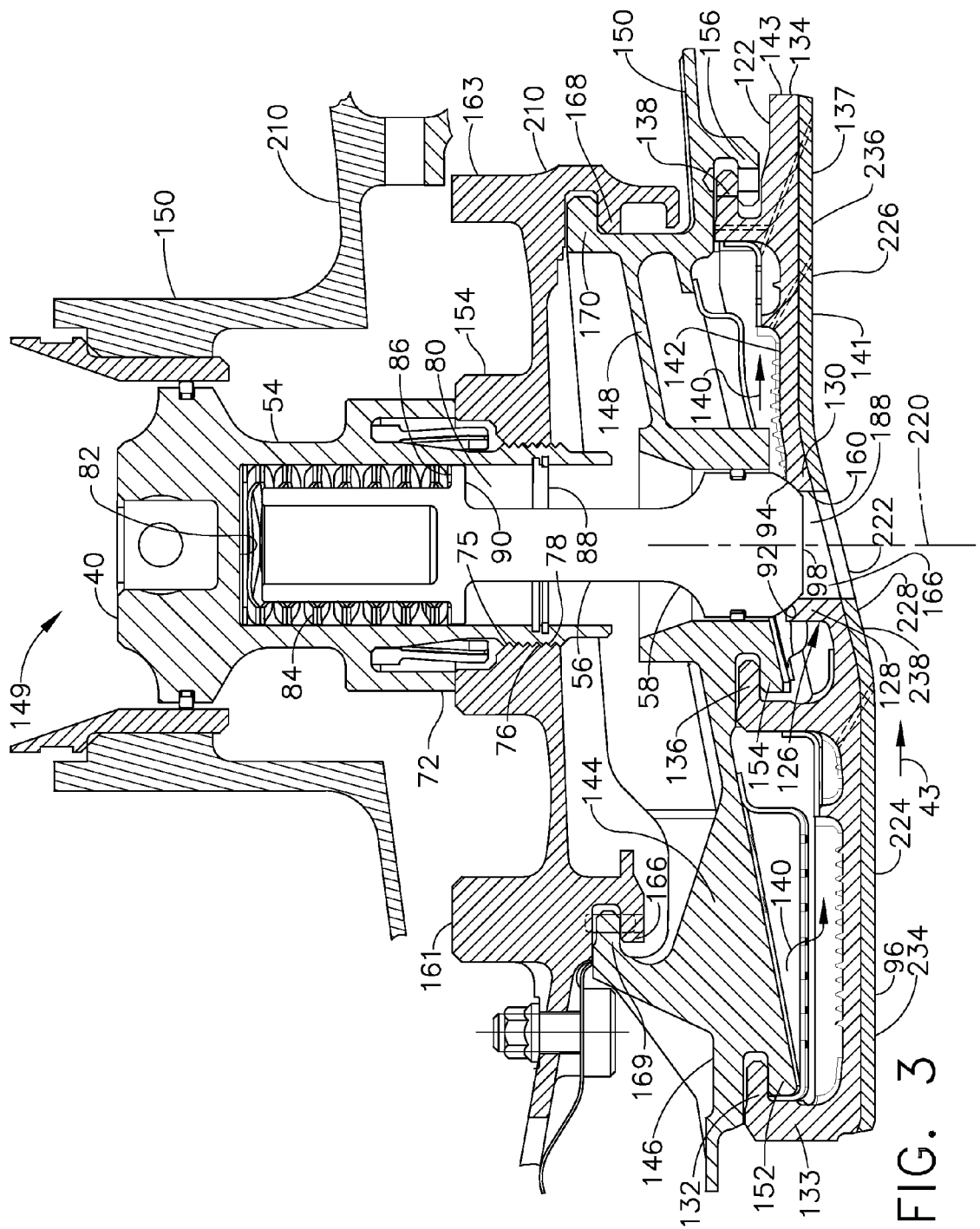
FIG. 3 is an enlarged sectional view illustration of the borescope port assembly of the engine illustrated in FIG. 2.
Figure 4:
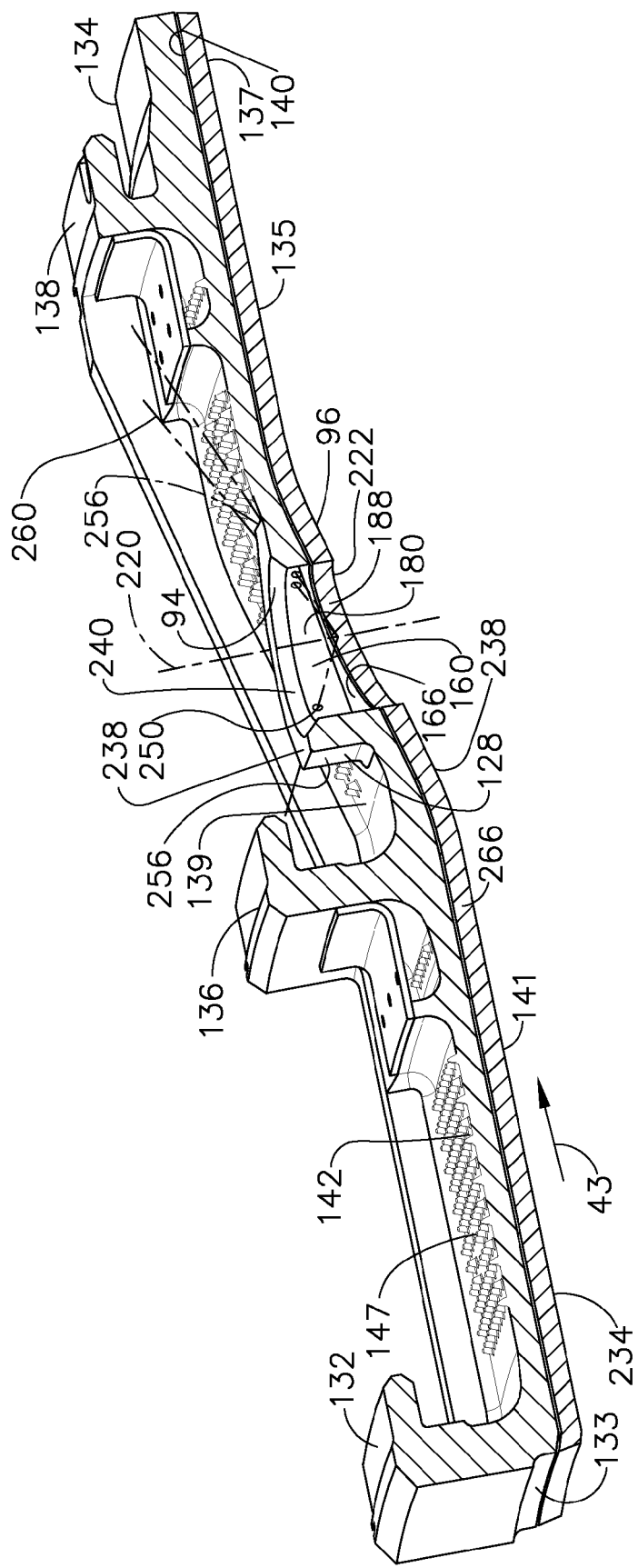
FIG. 4 is a perspective view illustration of turbine shroud segment having a coolable borescope boss illustrated in FIG. 3.

Referring to FIGS. 1 and 2, a second portion 51 of the core discharge pressure air 41 is flowed around the combustor between the outer combustor liner 113 and an outer combustor casing 120 and used to supply cooling air 140 to cool an annular segmented turbine shroud 122 circumscribed about the axial centerline axis 12 and surrounding both the single stage high pressure turbine 20 and the low pressure turbine first stage 129. Referring more particularly to FIGS. 3 and 4, the segmented turbine shroud 122 includes a plurality of arcuate shroud segments 134. Each arcuate shroud segment 134 is circumscribed about the axial centerline axis 12.

A hot outer surface 137 is on a first side 141 of the segment 134 forming in part a hot flowpath fluid surface 96 of the shroud 122. An outer coolable surface 139 is on a second side 142 of the segment 134. Turbulators 147 for cooling the second side 142 are disposed on the second side 142 and extend upward from the coolable surface 139. The second side 142 is opposite the first side 141 on the segment 134. A thermal barrier coating 135 is disposed on the first side 141 of each segment 134. Each shroud segment 134 includes a forward mounting hook 132 at a circumferential leading edge 133 of shroud segment 134, a midsection mounting hook 136, and an aft mounting hook 138 adjacent to a circumferential trailing edge 143 of shroud segment 134.

A plurality of circumferentially disposed shroud supports 144 surround and support the shroud segments 134. Each shroud support 144 circumferentially spans and supports radially adjacent shroud segments 134. Each shroud support 144 includes a forward section 146, a midsection 148 and an aft section 150 that include respective forwardly projecting forward, midsection, and aft hangers 152, 154 and 156 respectively. Forward, midsection, and aft mounting hooks 132, 136 and 138 are received by forward, midsection, and aft hangers 152, 154 and 156, respectively, in tongue-in-groove, or hook-in-hanger, interconnections such that shroud support 144 supports respective shroud segments 134.

Referring to FIG. 2, an annular turbine casing 200 and an inner annular sleeve 204 are bolted to a flange 196 at an aft end 198 of the outer combustor casing 120. An annular ring structure 210 which serves as an extension of the turbine casing 200 maintains the shroud supports 144 in a desired position and in the exemplary embodiment illustrated herein. Referring to FIG. 3, the annular ring structure 210 is a one-piece continuous annular ring structure or casing. A radial position of each shroud support 144, as well as of each shroud segment 134, is closely controlled by radially outwardly extending forward and aft thermal control rings 161, 163 (also referred to as pseudo-flanges) formed on the annular ring structure 210. Forward projecting forward and aft casing hangers 166, 168 depend radially inwardly from the forward and aft thermal control rings 161, 163 respectively. The forward and aft casing hangers 166, 168 receive and/or cooperate with axially rearwardly projecting forward and aft mounting hooks 169, 170 of forward and aft sections 146, 150 of the shroud supports 144 respectively in a circumferential tongue-in-groove or hook-in-hanger interconnection.

A borescope inspection port assembly 149, having a cooled inspection port 126 in at least one of the shroud segments 134, is used to insert a borescope (not illustrated herein) between the single stage high pressure turbine 20 and the low pressure turbine first stage 129 as illustrated in FIG. 2. The cooled inspection port 126 disclosed herein includes a radially inner coolable borescope boss 128 in at least one of the shroud segments 134 of the segmented turbine shroud 122 as illustrated in FIGS. 3 and 4. The borescope inspection port assembly 149 illustrated in FIGS. 2 and 3 includes an outer port 151 in the turbine casing 200. An intermediate port 157 of the borescope inspection port assembly 149 is formed in the annular ring structure 210. A shroud port 160 of the borescope inspection port assembly 149 includes the coolable borescope boss 128 formed in one of the shroud segments 134 of the segmented turbine shroud 122.

A borescope plug 40 installed in the borescope inspection port assembly 149 is accessed through an access port 42 in the bypass duct 24 as illustrated in FIGS. 1 and 2. Referring to FIG. 3, the borescope plug 40 includes a plug body 54 and a plunger 56 having a tip 58. The plunger 56 is positioned for sliding coaxial movement relative to the plug body 54. The plug body 54 extends radially inwardly through and sealingly engaging the outer port 151 in the turbine casing 200 and the intermediate port 157 in the annular ring structure 210 so that the tip 58 fills and seals off the shroud port 160 in the shroud segment 134 of the shroud 122. A seating shoulder 72 of the borescope plug body 54 seats against the intermediate port 157.

A lower portion 75 of the borescope plug body 54 has threads 76 that engage threads 78 on the intermediate port 157. The shoulder 72 sits on and seals the intermediate port 157 when the borescope plug 40 is screwed down. The plug body 54 has an axial cavity 80 with a circular spring seat 82. A cylindrical spring 84 extends radially inwardly from the spring seat 82 to a spring seat 86 of the plunger 56. The spring 84 tends to force the plunger 56 as far down in the axial cavity 80 as possible. The plunger 56 is equipped with a flange 90 that engages a retainer 88 to prevent exit of the plunger 56 from the axial cavity 80 of the plug body 54. The plunger 56 bottoms against a retainer 88 when disassembled from the borescope inspection port.

Referring to FIGS. 3 and 4, a boss hole 180 having a boss hole axis 220 extends through the coolable borescope boss 128 terminating at a hole exit 222 flush with the outer surface 137 of the shroud segment 134. The coolable borescope boss 128 extends radially outwardly, with respect to the axial centerline axis 12, away from the coolable surface 139 of the shroud segment 134. A coolable borescope boss may also be used on non annular elements and, thus, may be described more broadly as extending away from the second side. Because the turbine shroud 122 surrounds both the single stage high pressure turbine 20 and the low pressure turbine first stage 129, which circumscribe the axial centerline axis 12, the turbine shroud 122 has a cylindrical shroud first section 224 surrounding the single stage high pressure turbine 20, a cylindrical shroud second section 226 surrounding the low pressure turbine first stage 129, and a conical shroud midsection 228 therebetween. Thus, each of the shroud segments 134 has a cylindrical segment first section 234, a cylindrical segment second section 236, and a conical segment midsection 238 therebetween corresponding to the first, second, and midsections of the shroud 122. Thus, the hole exit 222 is flush with the outer surface 137 along the conical shroud midsection 228 of the shroud segment 134.

Figure 5:
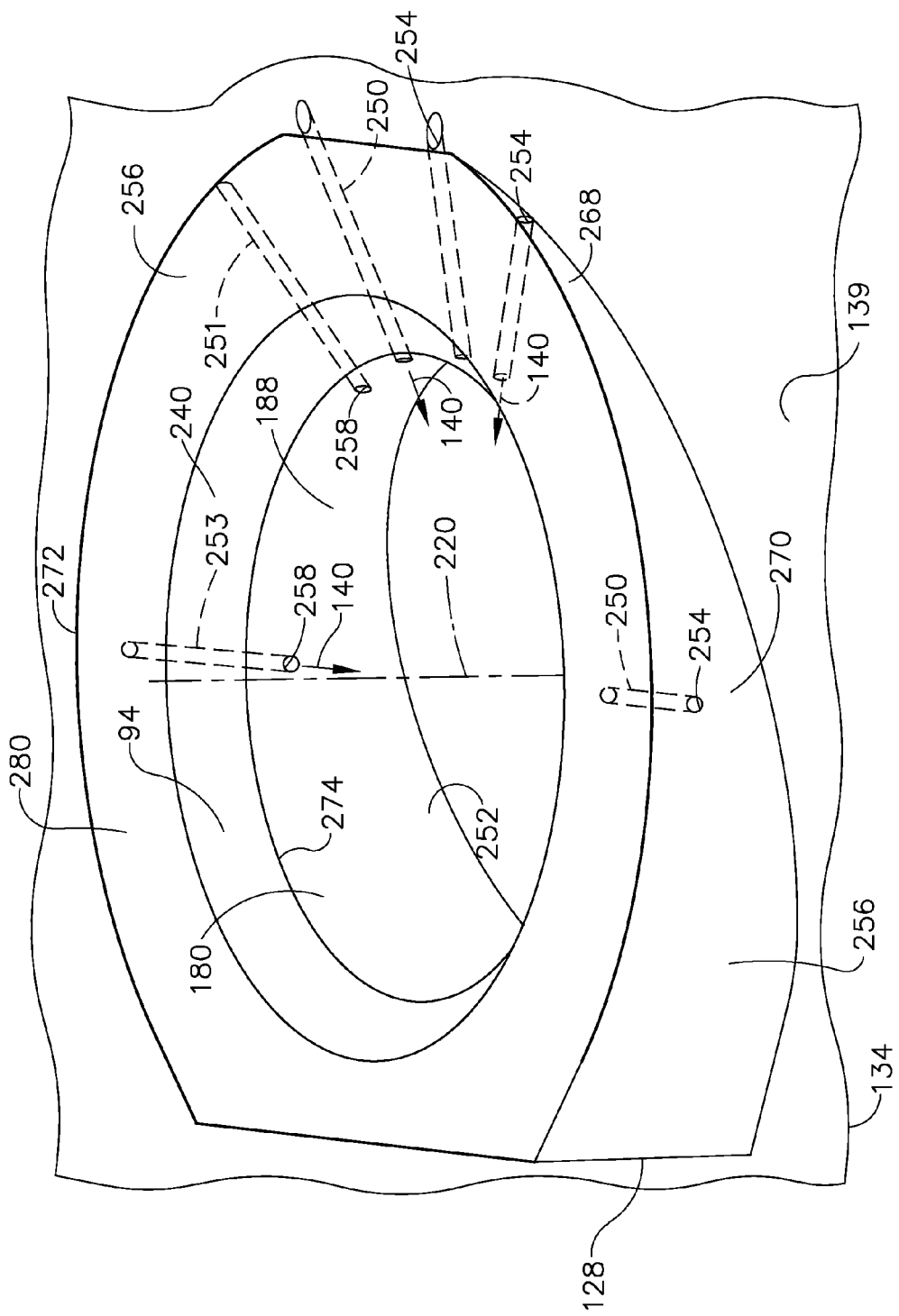
FIG. 5 is a perspective view illustration of the coolable borescope boss illustrated in FIG. 4.

Referring to FIGS. 3-5, the tip 58 of the borescope plug 40 has a spherical tip chamfer 92 which seals against a conical boss chamfer 94 in the coolable borescope boss 128 around an entrance 240 to the boss hole 180 in order to seal the tip 58 against hot combustion gases 43 flowing along a hot flowpath fluid surface 96 of the shroud 122. A radially inwardly most tip surface 98 of the tip 58 is thus recessed from the flowpath fluid surface 96 when the spherical tip chamfer 92 is seated within the conical boss chamfer 94 thus forming a borescope tip cavity 188 within the boss hole 180 extending axially, with respect to the boss hole axis 220, between the outer surface 137 and the tip surface 98 as further illustrated in FIGS. 3 and 4. Though the tip chamfer 92 is illustrated as being spherical and the boss chamfer 94 is illustrated as being conical they both may be otherwise shaped.

Referring to FIGS. 4 and 5, cooling passages 250 extend through the coolable borescope boss 128 into the borescope tip cavity 188 within the boss hole 180. The borescope tip cavity 188 is generally below or radially inward of the boss chamfer 94 and has a cylindrical cavity surface 252. The cooling passages 250 are oriented to spray cooling air 140 towards the boss hole axis 220. Some of the cooling passages 250 have cooling inlets 254 in a boss outer surface 256 of the coolable borescope boss 128 radially outward of or above the coolable surface 139 of the shroud segment 134. Others of the cooling passages 250 have cooling inlets 254 in the coolable surface 139 of the shroud segment 134. All of the cooling passages 250 have cooling outlets 258 at least partially disposed in the cylindrical cavity surface 252. The cooling passages 250 are aimed at the boss hole axis 220 and, more specifically, within the borescope tip cavity 188. Centerlines 260 of the cooling passages 250 may intersect the boss hole axis 220.

One quarter of a full shroud segment 134 and only one half of the coolable borescope boss 128 is illustrated in FIG. 4 and, thus, only one half of a number of the cooling passages 250 are illustrated for the embodiment of the cooling passages 250 and the boss hole axis 220 illustrated therein. Three of the cooling passages 250 are illustrated, the other three would be a mirror image about a centerplane 266 as illustrated in FIG. 5. Four aft cooling passages 251 are in an aft end 268 of the coolable borescope boss 128 and two side cooling passages 253 are in first and second sides 270, 272 of the coolable borescope boss 128 and generally perpendicular to the centerline axis 12 (not shown in FIG. 5). The aft cooling passages 251 have cooling inlets 254 in the coolable surface 139 of the shroud segment 134. The side cooling passages 253 have cooling inlets 254 in the boss outer surface 256 of the coolable borescope boss 128.

Figure 6:
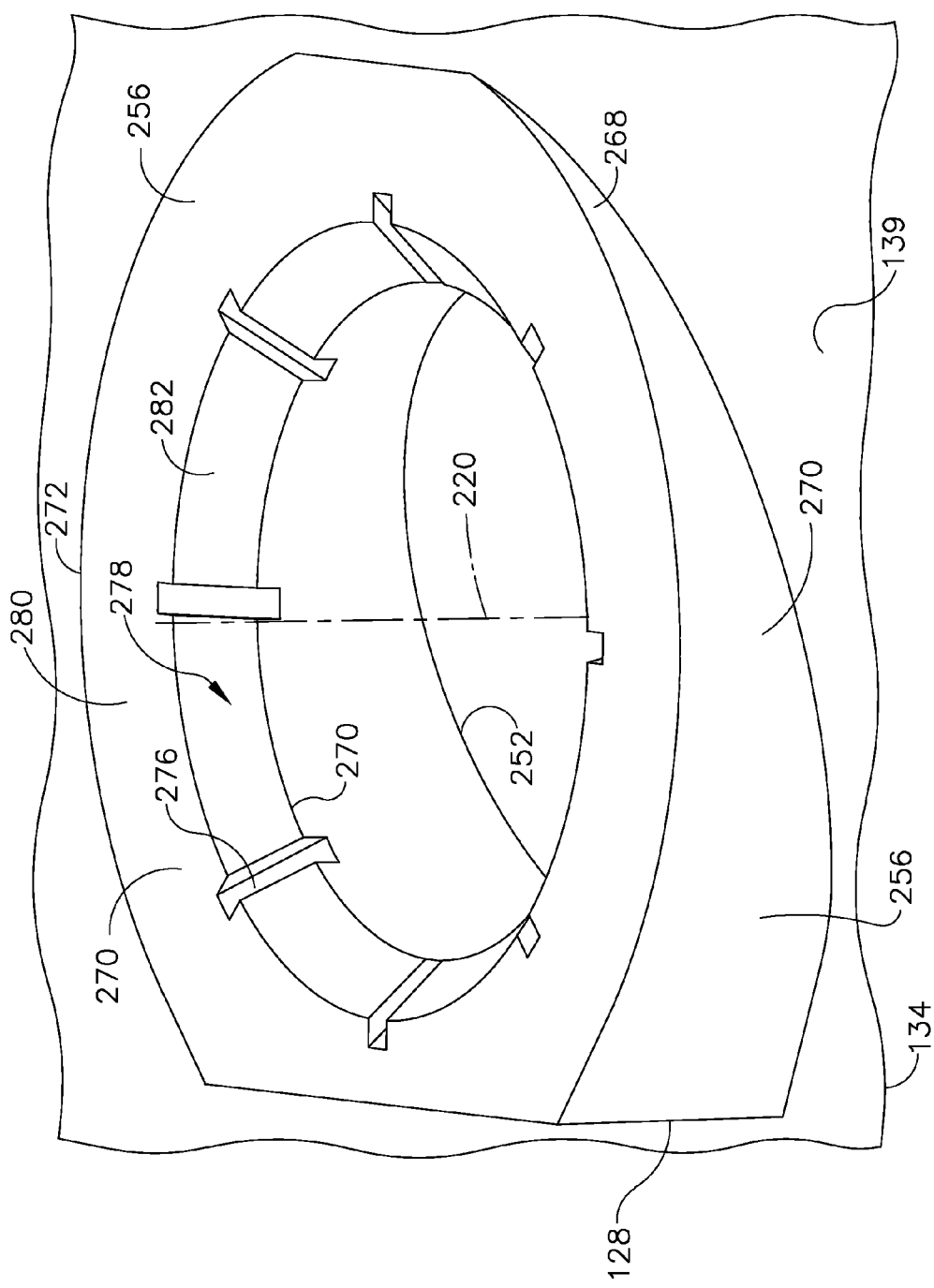
FIG. 6 is a perspective view illustration of an alternative coolable borescope boss.

Referring to FIG. 5, the cooling outlets 258 are at least partially disposed in the cylindrical cavity surface 252 between the hole exit 222 of the boss hole 180 and a chamfer inner end 274 of the boss chamfer 94 in the coolable borescope boss 128 around the entrance 240 to the boss hole 180. The cooling passages 250 are illustrated in FIGS. 4 and 5 as being cylindrical. An alternative embodiment of the cooling passages 250, illustrated in FIG. 6, has top open slots 276 disposed through the coolable borescope boss 128. The top open slots 276 extend through and into the coolable borescope boss 128 from a continuous outer surface 278 of the coolable borescope boss 128. The continuous outer surface 278 include a top surface 280 of the coolable borescope boss 128 surrounding the entrance 240 to the boss hole 180, the boss outer surface 256 of the coolable borescope boss 128, a conical outer surface 282 of the boss chamfer 94, and the cylindrical cavity surface 252.

The cooling passages 250 provide cooling of the borescope tip cavity 188 between the outer surface 137 of the shroud segment 134 and the tip surface 98 of the tip 58 of the borescope plug 40. The cooling passages 250 also provide cooling of the coolable borescope boss 128 and in turn the conical outer surface 282 of the boss chamfer 94. Both modes of cooling help maintain a good fit and seal between the tip 58 of the borescope plug 40 and the coolable borescope boss 128. The coolable borescope boss 128 also helps reduce thermal degradation of the tip 58 of the borescope plug 40 and the area of the outer surface 137 of the shroud segment 134 surrounding the hole exit 222 of the boss hole 180.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A coolable element comprising:
    opposite first and second sides of the element,
    a coolable borescope boss extending away from the second side,
    a boss hole extending through the coolable borescope boss and terminating at a hole exit flush with a first outer surface of the first side, and
    cooling passages extending through the coolable borescope boss and being oriented for spraying cooling air into the boss hole.

2. A coolable element as claimed in claim 1, further comprising the cooling passages being oriented for the spraying cooling air towards a boss hole axis of the boss hole.

3. A coolable element as claimed in claim 2, further comprising centerlines of the cooling passages intersecting the boss hole axis.

4. A coolable element as claimed in claim 1 further comprising a conical boss chamfer in the coolable borescope boss around an entrance to the boss hole.

5. A coolable element as claimed in claim 1, further comprising:
a cylindrical cavity surface between the hole exit and a chamfer inner end of a boss chamfer in the coolable borescope boss around an entrance to the boss hole,
a first portion of the cooling passages having a first portion of cooling inlets in a boss outer surface of the coolable borescope boss radially outward of or above the coolable surface,
a second portion of the cooling passages having a second portion cooling inlets in the coolable surface, and
the cooling passages having cooling outlets at least partially disposed in the cylindrical cavity surface.

6. A coolable element as claimed in claim 5, further comprising centerlines of the cooling passages intersecting the boss hole axis.

7. A coolable element as claimed in claim 6, further comprising the cooling passages being cylindrical.

8. A coolable element as claimed in claim 6, further comprising the cooling passages being open slots disposed through the coolable borescope boss.

9. A coolable element as claimed in claim 8, further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

10. A coolable element as claimed in claim 9 further comprising the boss chamfer and the outer surface of the boss chamfer being conical.

11. A coolable gas turbine engine shroud segment comprising:
the shroud segment being arcuate and circumscribed about an axial centerline axis,
opposite first and second sides of the segment,
a coolable borescope boss extending away from the second side,
a boss hole extending through the coolable borescope boss and terminating at a hole exit flush with a first outer surface of the first side, and
cooling passages extending through the coolable borescope boss and being oriented for spraying cooling air into the boss hole.

12. A coolable segment as claimed in claim 11, further comprising the cooling passages being oriented for the spraying cooling air towards a boss hole axis of the boss hole.

13. A coolable segment as claimed in claim 12, further comprising centerlines of the cooling passages intersecting the boss hole axis.

14. A coolable segment as claimed in claim 11 further comprising a conical boss chamfer in the coolable borescope boss around an entrance to the boss hole.

15. A coolable segment as claimed in claim 11, further comprising:
a cylindrical cavity surface between the hole exit and a chamfer inner end of a boss chamfer in the coolable borescope boss around an entrance to the boss hole,
a first portion of the cooling passages having a first portion of cooling inlets in a boss outer surface of the coolable borescope boss radially outward of or above the coolable surface,
a second portion of the cooling passages having a second portion of cooling inlets in the coolable surface, and
the cooling passages having cooling outlets at least partially disposed in the cylindrical cavity surface.

16. A coolable segment as claimed in claim 15, further comprising centerlines of the cooling passages intersecting the boss hole axis.

17. A coolable segment as claimed in claim 16, further comprising the cooling passages being cylindrical.

18. A coolable segment as claimed in claim 16, further comprising the cooling passages being open slots disposed through the coolable borescope boss.

19. A coolable segment as claimed in claim 18, further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

20. A coolable segment as claimed in claim 19 further comprising the boss chamfer and the outer surface of the boss chamfer being conical.

21. A coolable segment as claimed in claim 11, further comprising the segment having cylindrical segment first and second sections and a conical segment midsection therebetween and the hole exit being flush with the conical segment midsection.

22. A coolable segment as claimed in claim 21, further comprising the cooling passages being oriented for the spraying cooling air towards a boss hole axis of the boss hole.

23. A coolable segment as claimed in claim 22, further comprising centerlines of the cooling passages intersecting the boss hole axis.

24. A coolable segment as claimed in claim 21 further comprising a conical boss chamfer in the coolable borescope boss around an entrance to the boss hole.

25. A coolable segment as claimed in claim 21, further comprising:
a cylindrical cavity surface between the hole exit and a chamfer inner end of a boss chamfer in the coolable borescope boss around an entrance to the boss hole,
a first portion of the cooling passages having a first portion of cooling inlets in a boss outer surface of the coolable borescope boss radially outward of or above the coolable surface,
a second portion of the cooling passages having a second portion of cooling inlets in the coolable surface, and
the cooling passages having cooling outlets at least partially disposed in the cylindrical cavity surface.

26. A coolable segment as claimed in claim 25, further comprising centerlines of the cooling passages intersecting the boss hole axis.

27. A coolable segment as claimed in claim 26, further comprising the cooling passages being cylindrical.

28. A coolable segment as claimed in claim 26, further comprising the cooling passages being open slots disposed through the coolable borescope boss.

29. A coolable segment as claimed in claim 28, further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

30. A coolable segment as claimed in claim 29 further comprising the boss chamfer and the outer surface of the boss chamfer being conical.

31. An annular segmented turbine shroud assembly comprising:
   an annular segmented turbine shroud circumscribed about an axial centerline axis and having a plurality of shroud segments,
   at least one of the shroud segments having opposite first and second sides,
   a coolable borescope boss extending away from the second side,
   a boss hole extending through the coolable borescope boss and terminating at a hole exit flush with a first outer surface of the first side, and
   cooling passages extending through the coolable borescope boss and being oriented for spraying cooling air into the boss hole.

32. An assembly as claimed in claim 31, further comprising the cooling passages being oriented for the spraying cooling air towards a boss hole axis of the boss hole.

33. An assembly as claimed in claim 32, further comprising centerlines of the cooling passages intersecting the boss hole axis.

34. An assembly as claimed in claim 31 further comprising the boss chamfer being cylindrical.

35. An assembly as claimed in claim 34, further comprising:
   a cylindrical cavity surface between the hole exit and a chamfer inner end of a boss chamfer in the coolable borescope boss around an entrance to the boss hole,
   a borescope plug including a plug body and a plunger having a tip, and
   the tip having a spherical tip chamfer sealing against the cylindrical boss chamfer.

36. An assembly as claimed in claim 35 further comprising the cooling passages being oriented for the spraying cooling air towards a boss hole axis of the boss hole.

37. An assembly as claimed in claim 36 further comprising a first portion of the cooling passages having a first portion of cooling inlets in a boss outer surface of the coolable borescope boss radially outward of or above the coolable surface, a second portion of the cooling passages having a second portion of cooling inlets in the coolable surface, and the cooling passages having cooling outlets at least partially disposed in the cylindrical cavity surface.

38. An assembly as claimed in claim 37 further comprising centerlines of the cooling passages intersecting the boss hole axis.

39. An assembly as claimed in claim 37 further comprising the cooling passages being cylindrical.

40. An assembly as claimed in claim 37 further comprising the cooling passages being open slots disposed through the coolable borescope boss.

41. An assembly as claimed in claim 40 further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

42. An assembly as claimed in claim 31, further comprising:
   a cylindrical cavity surface between the hole exit and a chamfer inner end of a boss chamfer in the coolable borescope boss around an entrance to the boss hole,
   a first portion of the cooling passages having a first portion of cooling inlets in a boss outer surface of the coolable borescope boss radially outward of or above the coolable surface,
   a second portion of the cooling passages having a second portion of cooling inlets in the coolable surface, and
   the cooling passages having cooling outlets at least partially disposed in the cylindrical cavity surface.

43. An assembly as claimed in claim 42, further comprising centerlines of the cooling passages intersecting the boss hole axis.

44. An assembly as claimed in claim 43, further comprising the cooling passages being cylindrical.

45. An assembly as claimed in claim 43, further comprising the cooling passages being open slots disposed through the coolable borescope boss.

46. An assembly as claimed in claim 45, further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

47. An assembly as claimed in claim 46 further comprising the boss chamfer and the outer surface of the boss chamfer being conical.

48. An assembly as claimed in claim 31, further comprising:
   the annular segmented turbine shroud having cylindrical shroud first and second sections and a conical shroud midsection therebetween,
   the segment having cylindrical segment first and second sections and a conical segment midsection therebetween, and
   the hole exit being flush with the conical segment midsection.

49. An assembly as claimed in claim 48, further comprising the cooling passages being oriented for the spraying cooling air towards a boss hole axis of the boss hole.

50. An assembly as claimed in claim 49, further comprising centerlines of the cooling passages intersecting the boss hole axis.

51. An assembly as claimed in claim 48 further comprising a conical boss chamfer in the coolable borescope boss around an entrance to the boss hole.

52. An assembly as claimed in claim 48, further comprising:
   a cylindrical cavity surface between the hole exit and a chamfer inner end of a boss chamfer in the coolable borescope boss around an entrance to the boss hole,
   a first portion of the cooling passages having a first portion of cooling inlets in a boss outer surface of the coolable borescope boss radially outward of or above the coolable surface,
   a second portion of the cooling passages having a second portion of cooling inlets in the coolable surface, and
   the cooling passages having cooling outlets at least partially disposed in the cylindrical cavity surface.

53. An assembly as claimed in claim 52, further comprising centerlines of the cooling passages intersecting the boss hole axis.

54. An assembly as claimed in claim 53, further comprising the cooling passages being cylindrical.

55. An assembly as claimed in claim 53, further comprising the cooling passages being open slots disposed through the coolable borescope boss.

56. An assembly as claimed in claim 55, further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

57. An assembly as claimed in claim 56 further comprising the boss chamfer and the outer surface of the boss chamfer being conical.

58. A turbine assembly comprising:
high and low pressure turbines,
an annular segmented turbine shroud circumscribed about an axial centerline axis and having a plurality of shroud segments,
the shroud having cylindrical shroud first and second sections and a conical shroud midsection therebetween,
the cylindrical shroud first section surrounding the high pressure turbine,
the cylindrical shroud second section surrounding the low pressure turbine first stage,
at least one of the shroud segments having opposite first and second sides,
a coolable borescope boss extending away from the second side,
a boss hole extending through the coolable borescope boss and terminating at a hole exit flush with a first outer surface of the first side, and
cooling passages extending through the coolable borescope boss and being oriented for spraying cooling air into the boss hole.

59. An assembly as claimed in claim 58, further comprising the cooling passages being oriented for the spraying cooling air towards a boss hole axis of the boss hole.

60. An assembly as claimed in claim 59, further comprising centerlines of the cooling passages intersecting the boss hole axis.

61. An assembly as claimed in claim 58 further comprising the boss chamfer being spherical.

62. An assembly as claimed in claim 58, further comprising:
a cylindrical cavity surface between the hole exit and a chamfer inner end of a boss chamfer in the coolable borescope boss around an entrance to the boss hole,
a first portion of the cooling passages having a first portion of cooling inlets in a boss outer surface of the coolable borescope boss radially outward of or above the coolable surface,
a second portion of the cooling passages having a second portion of cooling inlets in the coolable surface, and
the cooling passages having cooling outlets at least partially disposed in the cylindrical cavity surface.

63. An assembly as claimed in claim 62, further comprising the cooling passages being cylindrical.

64. An assembly as claimed in claim 62, further comprising the cooling passages being open slots disposed through the coolable borescope boss.

65. An assembly as claimed in claim 64, further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

66. An assembly as claimed in claim 65 further comprising the boss chamfer and the outer surface of the boss chamfer being conical.

67. An assembly as claimed in claim 62, further comprising:
a cylindrical cavity surface between the hole exit and a chamfer inner end of a boss chamfer in the coolable borescope boss around an entrance to the boss hole,
a borescope plug including a plug body and a plunger having a tip,
the boss chamfer and the outer surface of the boss chamfer being conical, and
the tip having a spherical tip chamfer sealing against the conical boss chamfer.

68. An assembly as claimed in claim 67 further comprising a first portion of the cooling passages having a first portion of cooling inlets in a boss outer surface of the coolable borescope boss radially outward of or above the coolable surface, a second portion of the cooling passages having a second portion of cooling inlets in the coolable surface, and the cooling passages having cooling outlets at least partially disposed in the cylindrical cavity surface.

69. An assembly as claimed in claim 68 further comprising the cooling passages being cylindrical.

70. An assembly as claimed in claim 68 further comprising the cooling passages being open slots disposed through the coolable borescope boss.

71. An assembly as claimed in claim 70 further comprising the open slots extending through and into the coolable borescope boss from a continuous outer surface of the coolable borescope boss and the continuous outer surface including a top surface of the coolable borescope boss surrounding the entrance to the boss hole, the boss outer surface of the coolable borescope boss, an outer surface of the boss chamfer, and the cylindrical cavity surface.

* * * * *